Nov. 19, 1963

J. A. KUECKEN 3,111,668

POLARIZATION DIVERSITY MODULATION

Filed Aug. 22, 1960

INVENTOR.
JOHN A. KUECHEN.
BY
ATTORNEYS.

Nov. 19, 1963     J. A. KUECKEN     3,111,668
POLARIZATION DIVERSITY MODULATION
Filed Aug. 22, 1960     3 Sheets-Sheet 2

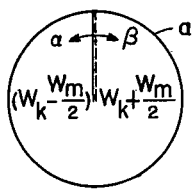
$W_k t = 0$
$W_k = \frac{9 W_m}{2}$

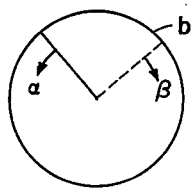
$W_k t = \frac{\pi}{4}$

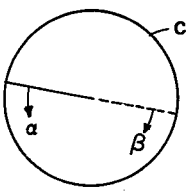
$W_k t = \frac{\pi}{2}$

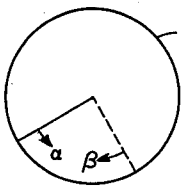
$W_k t = \frac{3\pi}{4}$

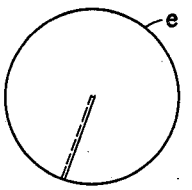
$W_k t = \pi$

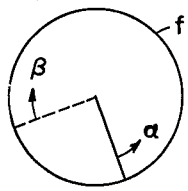
$W_k t = \frac{5\pi}{4}$

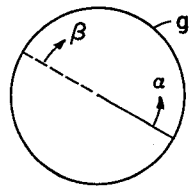
$W_k t = \frac{3\pi}{2}$

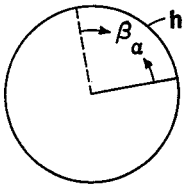
$W_k t = \frac{7\pi}{4}$

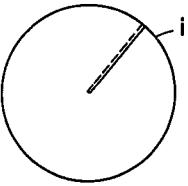
$W_k t = 2\pi$

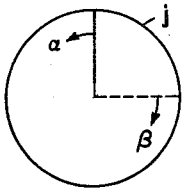
$W_k t = \frac{9\pi}{4}$

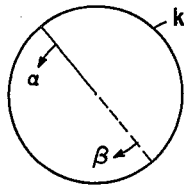
$W_k t = \frac{5\pi}{2}$

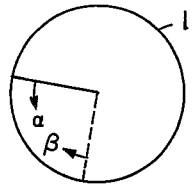
$W_k t = \frac{11\pi}{4}$

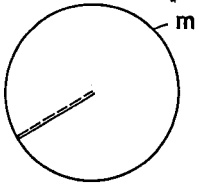
$W_k t = 3\pi$

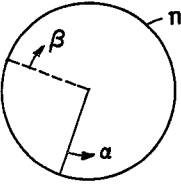
$W_k t = \frac{13\pi}{4}$

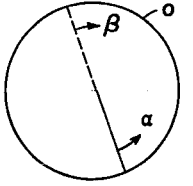
$W_k t = \frac{7\pi}{2}$

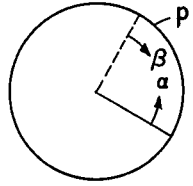
$W_k t = \frac{15\pi}{4}$

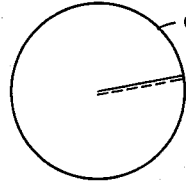
$W_k t = 4\pi$

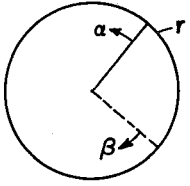
$W_k t = \frac{17\pi}{4}$

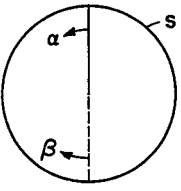
$W_k t = \frac{9\pi}{2}$

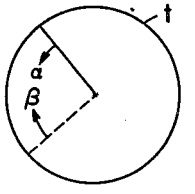
$W_k t = \frac{19\pi}{4}$

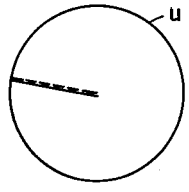
$W_k t = 5\pi$

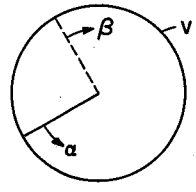
$W_k t = \frac{2\pi}{4}$

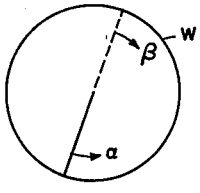
$W_k t = \frac{11\pi}{2}$

*Fig 2*

INVENTOR.
JOHN A. KUECHEN.
BY *Alden D. Redfield*
*Charles M. Hogan*
ATTORNEYS.

Nov. 19, 1963     J. A. KUECKEN     3,111,668
POLARIZATION DIVERSITY MODULATION
Filed Aug. 22, 1960     3 Sheets-Sheet 3

WITH NO MODULATION $L_1 = L_2$. AS MODULATION IS APPLIED $L_1 \neq L_2$

WITH NO MODULATION $C_1 = C_2$. AS MODULATION IS APPLIED $C_1 \neq C_2$

INVENTOR.
JOHN A. KUECHEN.
BY
ATTORNEYS.

3,111,668
POLARIZATION DIVERSITY MODULATION
John A. Kuecken, Cincinnati, Ohio, assignor to Avco Corporation, Cincinnati, Ohio, a corporation of Delaware
Filed Aug. 22, 1960, Ser. No. 51,013
2 Claims. (Cl. 343—100)

The present invention relates to improvements in polarization diversity modulation systems.

A principal object of the invention is to provide a system of modulation which possesses the advantages of polarization diversity reception, single side band system band width, and low modulation-power requirements.

For a better understanding of the present invention, together with other and further objects, advantages, and capabilities thereof, reference is made to the following description of the accompanying drawings, in which:

FIGS. 2a, 2b, 2c, 2d, 2e, 2f, 2g, 2h, 2i, 2j, 2k, 2l, 2m, 2n, 2o, 2p, 2r, 2s, 2t, 2u, 2v, 2w illustrate the positions of the polarization vectors representing the upper and lower side bands;

Figure 1:
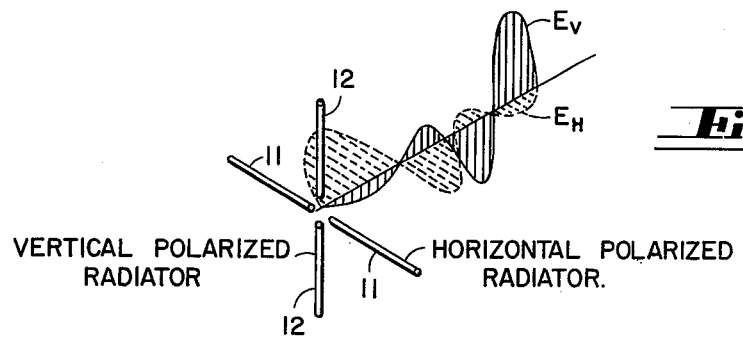
FIG. 1 is a drawing showing a suitable orthogonally polarized radiator set with dual antenna system suitable for use with the present invention, this figure also showing diagrammatically the application of modulation to the carrier signal.

In the system herein shown the advantages of polarization diversity are obtained through the use of a dual antenna system. While in practice any orthogonally polarized radiator set could be employed, such as dipoles, dominant mode wave guide horns and the like, in the preferred embodiment the dual antenna system consists of a horizontally polarized dipole radiator 11 and a vertically polarized dipole radiator 12, as shown in FIG. 1. FIG. 1 also illustrates the application of modulation to the R.F. signal in accordance with the invention.

Under no-signal conditions the horizontally and vertically polarized radiators are excited with equal powers. The modulation signal is applied in such a manner—i.e., in phase opposition—as alternately to increase the excitation on one radiator while decreasing excitation on the other. That is to say, a negative modulation signal increases the excitation on the horizontal radiator while decreasing the excitation on the vertical radiator. Conversely, a positive modulation signal increases excitation on the vertical radiator while decreasing it on the horizontal radiator.

This system is of maximum advantage when a constant impedance is presented to the transmitter. That is to say, the sum of the powers radiating from the horizontally and verticallyy polarized antennas is constant, regardless of the presence or amount of modulation. Now, such sum is equal to $$\frac{E_T^2}{R}$$

where $E_T$ is the transmitter supply voltage and R is the antenna impedance.

A few definitions are now in order:

$W_K$=The carrier frequency
$W_M$=The modulation frequency
$t$=Time
$M$=The modulation factor
$E_T$=Transmitter supply voltage In order to satisfy the requirement of presenting a constant impedance to the transmitter, the actual modulation signal must represent the square root of the normal amplitude modulation function. That is to say, $$E_H = .707 E_T \sqrt{1 + M \cos W_M t} \sin W_K t$$

$E_H$ being the voltage on the horizontal radiator.

Likewise, $E_V$, the voltage on the vertical radiator, must equal $$.707 E_T \sqrt{1 - M \cos W_M t} \sin W_K t$$

It is fundamental in trigometry that $$\sin \frac{\alpha}{2} = \sqrt{\frac{1-\cos \alpha}{2}} \qquad \cos \frac{\alpha}{2} = \sqrt{\frac{1+\cos \alpha}{2}}$$

Now, if it be assumed that M is equal to 1—i.e., a condition of 100% modulation, then $$E_H = E_T \cos \frac{W_M t}{2} \sin W_K t$$

$$E_V = E_T \sin \frac{W_M t}{2} \sin W_K t$$

But:

$$2 \sin \alpha \sin \beta = \cos (\alpha - \beta) - \cos (\alpha + \beta)$$
$$2 \sin \alpha \cos \beta = \sin (\alpha + \beta) + \sin (\alpha - \beta)$$

Thus:

$$E_H = \frac{E_T}{2}\left[\sin \left(W_K + \frac{W_M}{2}\right)t + \sin \left(W_K - \frac{W_M}{2}\right)t\right]$$

$$E_V = \frac{E_T}{2}\left[\cos \left(W_K - \frac{W_M}{2}\right)t - \cos \left(W_K + \frac{W_M}{2}\right)t\right]$$

This describes two oppositely-sensed circularly polarized waves of angular velocity $$\left(W_K + \frac{W_M}{2}\right)$$

and $$\left(W_K - \frac{W_M}{2}\right)$$

made up of the $E_H$ and $E_V$ sum and difference frequency terms.

From the foregoing, it will be seen that under conditions of 100% modulation, the radiation from the antenna system may be described in terms of two circularly polarized waves disposed in frequency above and below the carrier by a frequency equal to one-half the modulation frequency. It also noted that the carrier frequency completely disappears under this condition. Under the no-signal or no-modulation condition, a linearly-polarized carrier frequency wave inclined at a 45 degree angle is radiated. FIGS. 2a, 2b, etc., illustrate the position of the polarization vectors, $\alpha$ and $\beta$ representing the upper and lower side bands. The series of vector diagrams 2a, 2b, etc., is intended to illustrate the manner in which these circularly polarized waves rotate and add up to form the horizontally and vertically polarized components. These polarization components rotate in opposite directions and with a difference in angular velocity of $W_M$. Therefore both horizontal and vertical components are modulated at $W_M$ and not $$\frac{W_M}{2}$$

Thus it may be seen that a modulation frequency of $W_M$ is accommodated in a bandwidth of $W_M$ which is equivalent to single sideband performance and only one half of the bandwidth normally used for common amplitude modulation.

Figure 3:
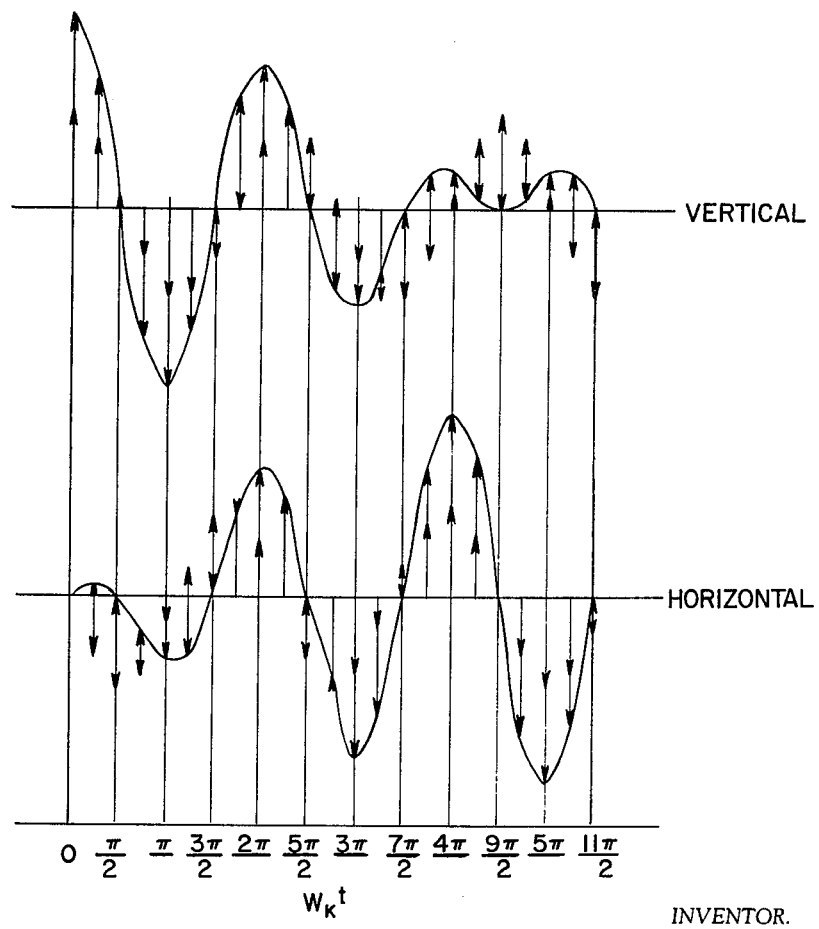
FIG. 3 illustrates the resultant R.F. envelopes to be detected by vertical and horizontal linearly polarized antennas.

By graphical means the vertically and horizontally polarized components are constructed. This construction is shown in FIG. 3. Here the vertical and horizontal components of the two circularly polarized waves are vectorially added for each of the time intervals shown in the series of FIGS. 2a, etc., and the resulting waves constructed. For clarity in the graphical illustration, $W_M$ has been made a much larger fraction of $W_K$ than would usually be employed.

It will be seen from a consideration of FIG. 3 that the full modulation information is contained in each signal. Since each signal carries the complete modulation information, the loss of either component in the transmitted wave will be accompanied by only a 3 decibel reduction in the received signal strength. This secures the anti-fading benefit of polarization diversity. Further, in military applications, the circularly polarized nature of the transmitted signals would be advantageous, because enemy direction-finding equipment can be confused by the presence of substantial cross-polarized signal components.

This system operates with approximately one half the band width required for an amplitude modulation system. The required modulation power in this system is very small and need only supply the losses in the modulator.

Since this modulation technique may be performed completely external to the transmitter and no change in impedance is presented to the transmitter, the transmitter may be operated at the full continuous wave power rating of the output stage. This would represent an increase in output power of approximately 29% over the level normally achieved in amplitude modulation transmitter design for a given equipment, since no reserve is required for amplitude peaks.

An advantage compared to normal single-sideband operation is also attained in that accurate phase shifting and linearity control is not required.

It may also be seen that this modulation technique could be imposed "on top of" an existing frequency modulation signal without cross-talk, provided both the vertically and horizontally polarized channels are received. Partial loss of one of the channels would be accompanied by an increasing cross-talk level between the amplitude modulation and frequency modulation channels.

Figure 4:
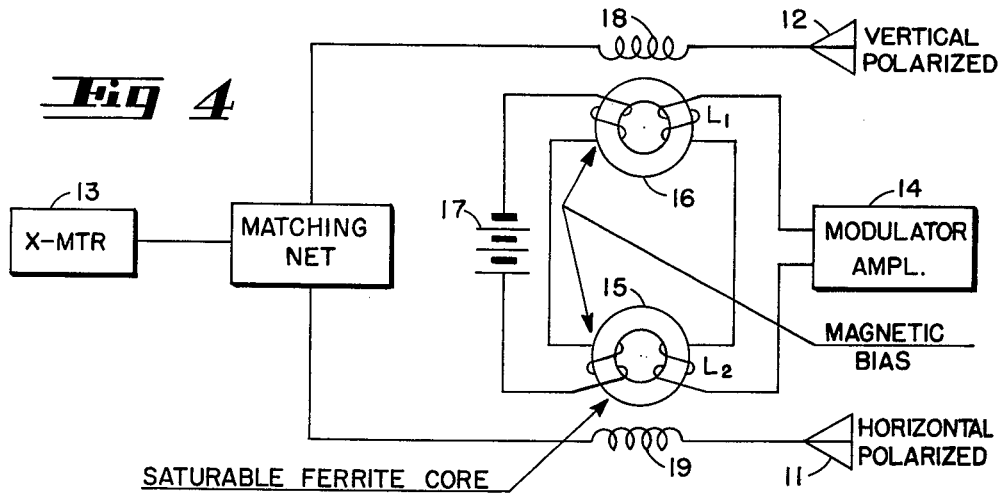
FIG. 4 is a schematic diagram of an inductive type modulator suitable for use with the invention.

In FIG. 4 there is shown an inductive type modulator arrangement in which the carrier output of transmitter 13 is modulated by saturable ferrite inductors 15 and 16. These inductors are biased from voltage supply 17 to an appropriate portion of their B-H curves and the modulation signal from amplifier 14 varies the inductances 18 and 19, thereby controlling the power input to each antenna.

Figure 5:
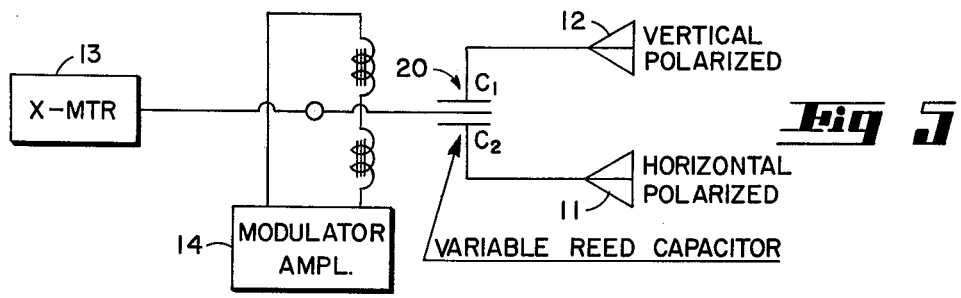
FIG. 5 is a schematic diagram of a capacitive type modulator suitable for use with the invention.

In FIG. 5 there is provided a variable-reed capacitance device 20 which varies capacitance $C_1$ in the vertical radiation system and capacitance $C_2$ in the horizontal radiation system, thereby controlling the input power to the two radiators.

Figure 6:
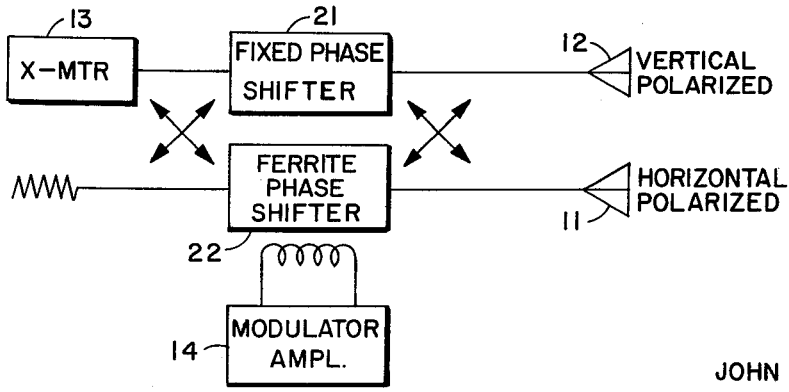
FIG. 6 is a schematic diagram of a microwave system exploiting the present invention.

In the FIG. 6 microwave system, a hybrid-ring power splitter involving fixed and ferrite phase shifters 21 and 22 is employed, and the modulation signal varies the phase shift in the ferrite phase shifter 22, thereby controlling the application of power to the two antenna radiators. The required non-linear response for the modulation system may be obtained in the power splitter by control of the transfer characteristics, or in the modulation amplifier 14 by feedback.

While there has been shown and described what are considered to be the preferred embodiments of the invention, it will be understood by those skilled in the art that various changes and modifications may be made therein without departing from the invention as defined in the appended claims.

I claim:
1. The combination of:
   First, an orthogonally polarized radiator set comprising a horizontally polarized radiator and a vertically polarized radiator;
   Second, transmitter means for applying a carrier to both of said radiators in such manner that, in the absence of modulation, both radiators radiate equal power; and
   Third, means interposed between the transmitter means and the radiators and comprising a hybrid-ring power splitter including a fixed ferrite phase shifter coupled to one of said radiators and an electrically variable ferrite phase shifter coupled to the other of said radiators for modulating the carrier in such manner that the sum of the power radiated by both carriers is constant,
   the modulating signal representing the square root of the normal modulating function so that

$$E_H = 0.707 E_T \sqrt{1 + M \cos W_M t} \sin W_K t$$

and $$E_V = 0.707 E_T \sqrt{1 - M \cos W_M t} \sin W_K t$$

where:
$E_T$=average amplitude of carrier or transmitter supply voltage;
$E_H$=voltage on one of said radiators;
$E_V$=voltage on the other radiator;
$M$=modulation factor;
$W_K$=carrier frequency;
$W_M$=modulation frequency;
$t$=time.

2. The combination as set forth in claim 1 in which the modulating means one hundred percent modulates the carrier.

References Cited in the file of this patent

UNITED STATES PATENTS 2,357,439   Usselman _____ Sept. 5, 1944